United States Patent
Huang et al.

(10) Patent No.: US 9,899,382 B2
(45) Date of Patent: Feb. 20, 2018

(54) FIN FIELD EFFECT TRANSISTOR (FINFET) DEVICE STRUCTURE WITH DIFFERENT GATE PROFILE AND METHOD FOR FORMING THE SAME

(71) Applicant: Taiwan Semiconductor Manufacturing Co., Ltd., Hsinchu (TW)

(72) Inventors: Yi-Ching Huang, Taipei (TW); Tsung-Yu Chiang, New Taipei (TW); Ya-Wen Yang, Xiushui Township, Changhua County (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 15/169,980

(22) Filed: Jun. 1, 2016

(65) Prior Publication Data

US 2017/0352656 A1    Dec. 7, 2017

(51) Int. Cl.
| | |
|---|---|
| *H01L 27/088* | (2006.01) |
| *H01L 29/66* | (2006.01) |
| *H01L 29/78* | (2006.01) |
| *H01L 21/8234* | (2006.01) |
| *H01L 21/265* | (2006.01) |
| *H01L 27/12* | (2006.01) |
| *H01L 29/423* | (2006.01) |

(52) U.S. Cl.
CPC ........ *H01L 27/0886* (2013.01); *H01L 21/265* (2013.01); *H01L 21/823431* (2013.01); *H01L 21/823468* (2013.01); *H01L 27/1211* (2013.01); *H01L 29/42376* (2013.01); *H01L 29/66545* (2013.01); *H01L 29/66795* (2013.01); *H01L 29/785* (2013.01); *H01L 2029/7858* (2013.01)

(58) Field of Classification Search
CPC ............. H01L 29/66795; H01L 29/785; H01L 29/7851; H01L 27/0924; H01L 27/0886; H01L 21/823431; H01L 21/823821
See application file for complete search history.

(56) References Cited

U.S. PATENT DOCUMENTS

| | | | |
|---|---|---|---|
| 7,667,271 B2 | 2/2010 | Yu et al. | |
| 8,362,575 B2 | 1/2013 | Kwok et al. | |
| 8,367,498 B2 | 2/2013 | Chang et al. | |
| 8,440,517 B2 | 5/2013 | Lin et al. | |
| 8,497,528 B2 | 7/2013 | Lee et al. | |
| 8,610,240 B2 | 12/2013 | Lee et al. | |
| 8,680,576 B2 | 3/2014 | Ching et al. | |
| 8,723,272 B2 | 5/2014 | Liu et al. | |
| 8,729,627 B2 | 5/2014 | Cheng et al. | |
| 8,729,634 B2 | 5/2014 | Shen et al. | |

(Continued)

*Primary Examiner* — Jesse Y Miyoshi
(74) *Attorney, Agent, or Firm* — Birch, Stewart, Kolasch & Birch, LLP

(57) ABSTRACT

A FinFET device structure is provided. The FinFET device structure includes a fin structure formed over a substrate and an isolation structure formed over the substrate. The FinFET device structure includes a first gate structure and a second gate structure formed over the fin structure. The first gate structure has a first top width in a direction that is parallel to the fin structure, the second gate structure has a second top width in a direction that is parallel to the fin structure, and the first top width is greater than the second top width.

18 Claims, 17 Drawing Sheets

(56) References Cited

U.S. PATENT DOCUMENTS

| | | |
|---|---|---|
| 8,785,285 B2 | 7/2014 | Tsai et al. |
| 8,796,759 B2 | 8/2014 | Perng et al. |
| 8,809,139 B2 | 8/2014 | Huang et al. |
| 8,828,823 B2 | 9/2014 | Liu et al. |
| 8,836,016 B2 | 9/2014 | Wu et al. |
| 8,841,701 B2 | 9/2014 | Lin et al. |
| 8,847,293 B2 | 9/2014 | Lee et al. |
| 8,853,025 B2 | 10/2014 | Zhang et al. |
| 9,305,923 B1* | 4/2016 | Ok ................. H01L 27/0924 |
| 2011/0068407 A1 | 3/2011 | Yeh et al. |
| 2013/0011983 A1 | 1/2013 | Tsai et al. |
| 2014/0252412 A1 | 9/2014 | Tsai et al. |
| 2016/0111531 A1* | 4/2016 | Dong ................. H01L 29/785 |
| | | 257/347 |

* cited by examiner

FIN FIELD EFFECT TRANSISTOR (FINFET) DEVICE STRUCTURE WITH DIFFERENT GATE PROFILE AND METHOD FOR FORMING THE SAME

BACKGROUND

Semiconductor devices are used in a variety of electronic applications, such as personal computers, cell phones, digital cameras, and other electronic equipment. Semiconductor devices are typically fabricated by sequentially depositing insulating or dielectric layers, conductive layers, and semiconductive layers of material over a semiconductor substrate, and patterning the various material layers using lithography to form circuit components and elements thereon. Many integrated circuits are typically manufactured on a single semiconductor wafer, and individual dies on the wafer are singulated by sawing between the integrated circuits along a scribe line. The individual dies are typically packaged separately, in multi-chip modules, for example, or in other types of packaging.

As the semiconductor industry has progressed into nanometer technology process nodes in pursuit of higher device density, higher performance, and lower costs, challenges from both fabrication and design issues have resulted in the development of three-dimensional designs, such as the fin field effect transistor (FinFET). FinFETs are fabricated with a thin vertical "fin" (or fin structure) extending from a substrate. The channel of the FinFET is formed in this vertical fin. A gate is provided over the fin. The advantages of a FinFET may include reducing the short channel effect and providing a higher current flow.

Although existing FinFET devices and methods of fabricating FinFET devices have generally been adequate for their intended purpose, they have not been entirely satisfactory in all respects.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
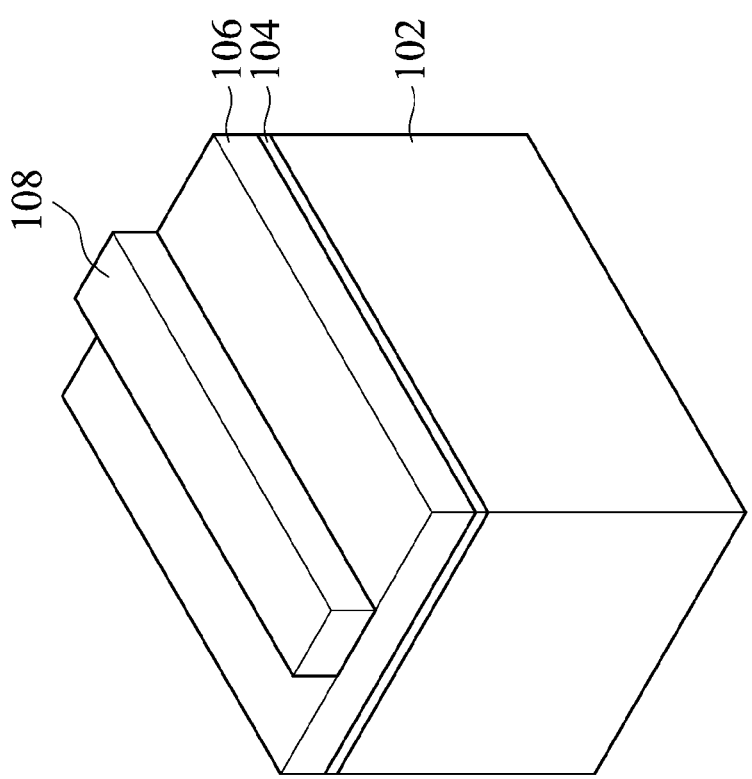
FIGS. 1A-1K show perspective representations of various stages of forming a FinFET device structure, in accordance with some embodiments of the disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and after the method, and some of the operations described can be replaced or eliminated for other embodiments of the method.

Embodiments for forming a fin field effect transistor (FinFET) device structure are provided. FIGS. 1A-1K show perspective representations of various stages of forming a FinFET device structure 100, in accordance with some embodiments of the disclosure.

Referring to FIG. 1A, a substrate 102 is provided. The substrate 102 may be made of silicon or other semiconductor materials. Alternatively or additionally, the substrate 102 may include other elementary semiconductor materials such as germanium. In some embodiments, the substrate 102 is made of a compound semiconductor such as silicon carbide, gallium arsenic, indium arsenide, or indium phosphide. In some embodiments, the substrate 102 is made of an alloy semiconductor such as silicon germanium, silicon germanium carbide, gallium arsenic phosphide, or gallium indium phosphide. In some embodiments, the substrate 102 includes an epitaxial layer. For example, the substrate 102 has an epitaxial layer overlying a bulk semiconductor.

Afterwards, a dielectric layer 104 and a mask layer 106 are formed over the substrate 102, and a photoresist layer 108 is formed over the mask layer 106. The photoresist layer 108 is patterned by a patterning process. The patterning process includes a photolithography process and an etching process. The photolithography process includes photoresist coating (e.g., spin-on coating), soft baking, mask aligning, exposure, post-exposure baking, developing the photoresist, rinsing and drying (e.g., hard baking). The etching process may include a dry etching process or a wet etching process.

The dielectric layer 104 is a buffer layer between the substrate 102 and the mask layer 106. In addition, the dielectric layer 104 is used as a stop layer when the mask layer 106 is removed. The dielectric layer 104 may be made of silicon oxide. The mask layer 106 may be made of silicon oxide, silicon nitride, silicon oxynitride, or another applicable material. In some other embodiments, more than one mask layer 106 is formed over the dielectric layer 104.

The dielectric layer 104 and the mask layer 106 are formed by deposition processes, such as a chemical vapor deposition (CVD) process, a high-density plasma chemical vapor deposition (HDPCVD) process, a spin-on process, a sputtering process, or another applicable process.

Figure 1B:
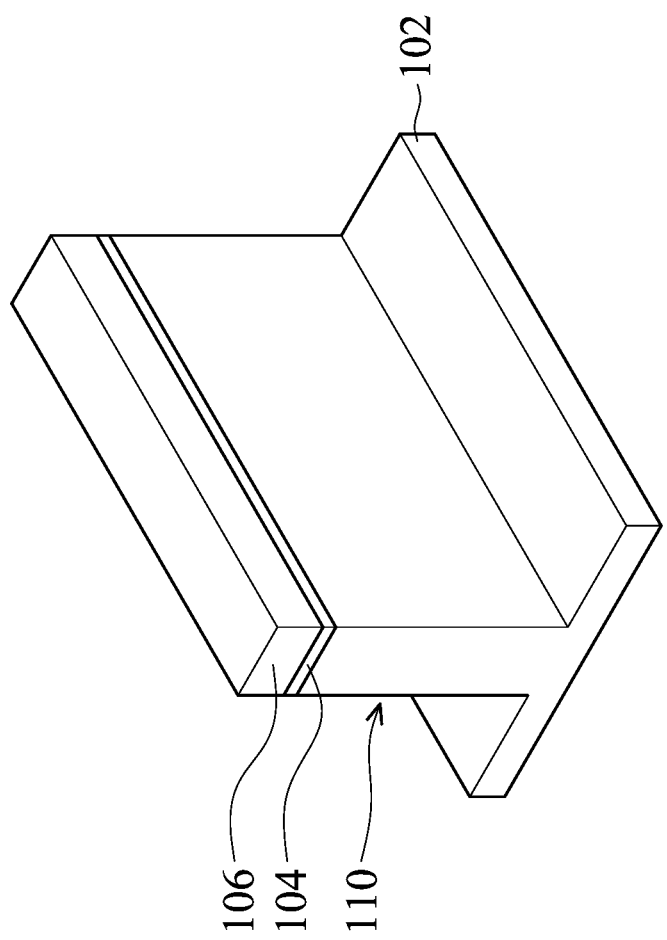

After the photoresist layer 108 is patterned, the dielectric layer 104 and the mask layer 106 are patterned by using the patterned photoresist layer 108 as a mask as shown in FIG. 1B, in accordance with some embodiments. As a result, a patterned pad layer 104 and a patterned mask layer 106 are obtained. Afterwards, the patterned photoresist layer 108 is removed.

Afterwards, an etching process is performed on the substrate 102 to form a fin structure 110 by using the patterned dielectric layer 104 and the patterned mask layer 106 as a mask. The etching process may be a dry etching process or a wet etching process.

In some embodiments, the substrate 102 is etched by a dry etching process. The dry etching process includes using a fluorine-based etchant gas, such as $SF_6$, $C_xF_y$, $NF_3$ or a combination thereof. The etching process may be a time-controlled process, and continue until the fin structure 110 reaches a predetermined height. In some other embodiments, the fin structure 110 has a width that gradually increases from the top portion to the lower portion.

Figure 1C:
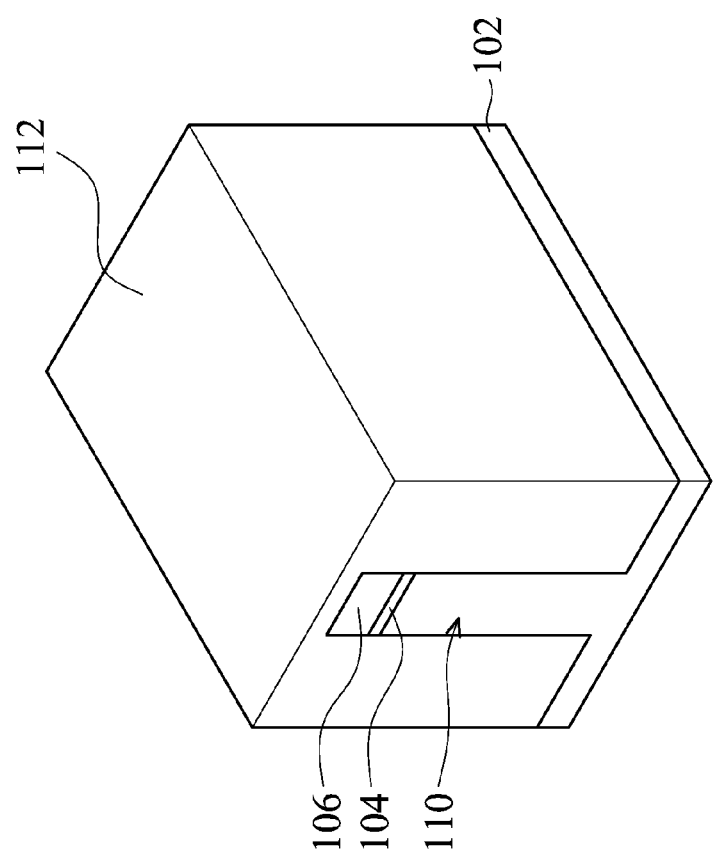

After the fin structure 110 is formed, an insulating layer 112 is formed to cover the fin structure 110 over the substrate 102 as shown in FIG. 1C, in accordance with some embodiments.

In some embodiments, the insulating layer 112 is made of silicon oxide, silicon nitride, silicon oxynitride, fluoride-doped silicate glass (FSG), or another low-k dielectric material. The insulating layer 112 may be deposited by a chemical vapor deposition (CVD) process, a spin-on-glass process, or another applicable process.

Afterwards, the insulating layer 112 is thinned or planarized to expose the top surface of the patterned mask layer 106. In some embodiments, the insulating layer 112 is thinned by a chemical mechanical polishing (CMP) process. Afterwards, the patterned dielectric layer 104 and the patterned mask layer 106 are removed.

Figure 1D:
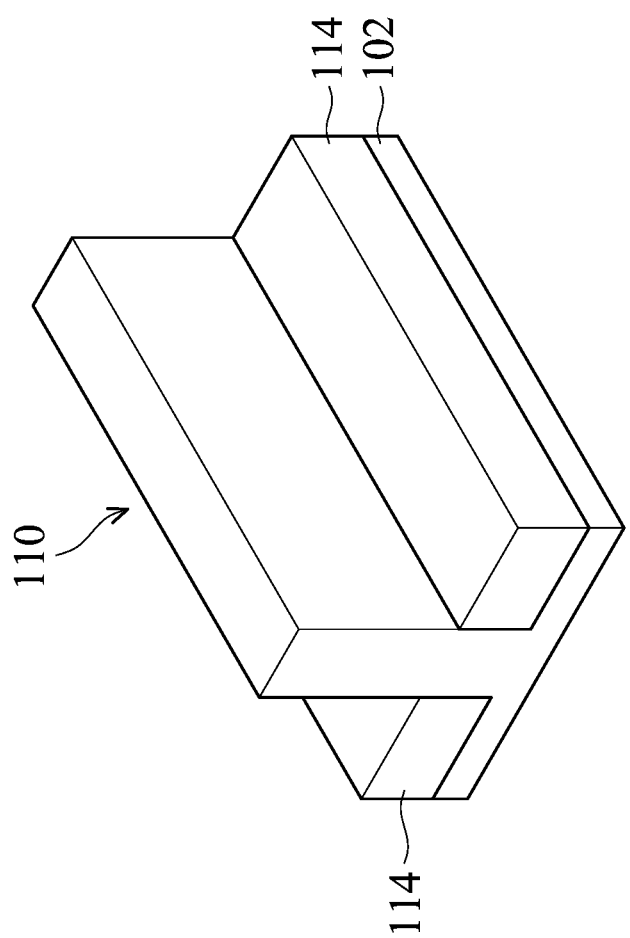

Afterwards, a portion of the insulating layer 112 is removed to form an isolation structure 114, as shown in FIG. 1D, in accordance with some embodiments. The isolation structure 114 may be a shallow trench isolation (STI) structure surrounding the fin structure 110. A lower portion of the fin structure 110 is surrounded by the isolation structure 114, and an upper portion of the fin structure 110 protrudes from the isolation structure 114. In other words, a portion of the fin structure 110 is embedded in the isolation structure 114. The isolation structure 114 prevents electrical interference or crosstalk.

Figure 1E:
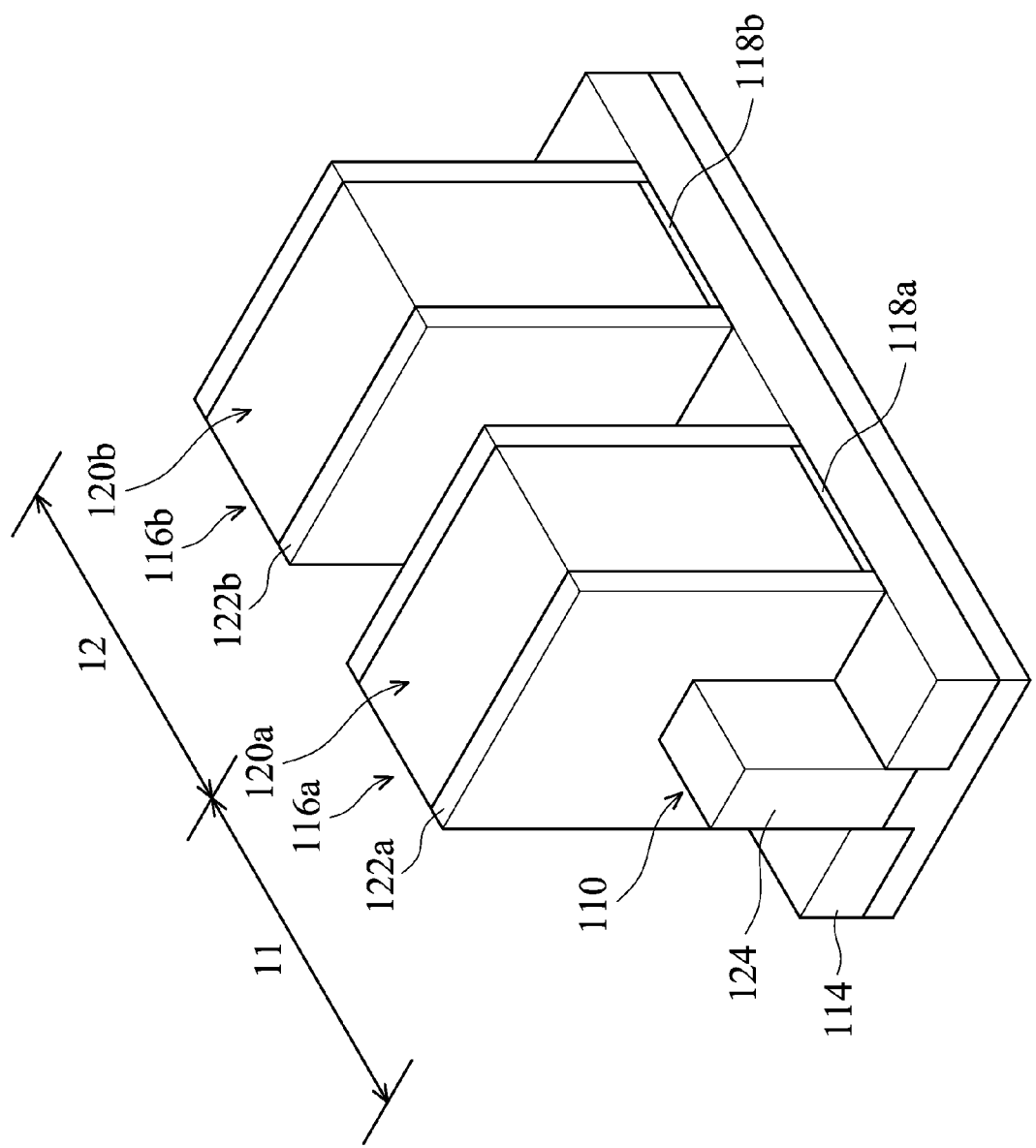

Afterwards, a first dummy gate structure 116a and a second dummy gate structure 116b are formed across the fin structure 110 and extends over the isolation structure 114 as shown in FIG. 1E, in accordance with some embodiments. The first dummy gate structure 116a is formed in a first region 11 and the second dummy gate structure 116b is formed in a second region 12.

In some embodiments, the first dummy gate structure 116a includes a first dummy gate dielectric layer 118a and a first dummy gate electrode layer 120a formed over the first dummy gate dielectric layer 118a. In some embodiments, the second dummy gate structure 116b includes a second dummy gate dielectric layer 118b and a second dummy gate electrode layer 120b formed over the second dummy gate dielectric layer 118b.

After the first dummy gate structure 116a and the second dummy gate structure 116b are formed, first spacers 122a are formed on opposite sidewalls of the first dummy gate structure 116a, and second spacers 122b are formed on opposite sidewalls of the second dummy gate structure 116b. The first spacers 122a and the second spacers 122b may be a single layer or multiple layers.

Afterwards, source/drain (S/D) structures 124 are formed over the fin structure 110. In some embodiments, portions of the fin structure 110 adjacent to the first dummy gate structure 116a and the second dummy gate structure 116b are recessed to form recesses at two sides of fin structure 110, and a strained material is grown in the recesses by an epitaxial (epi) process to form the source/drain (S/D) structures 124. In addition, the lattice constant of the strained material may be different from the lattice constant of the substrate 102. In some embodiments, the source/drain structures 124 include Ge, SiGe, InAs, InGaAs, InSb, GaAs, GaSb, InAlP, InP, or the like.

Figure 1F:
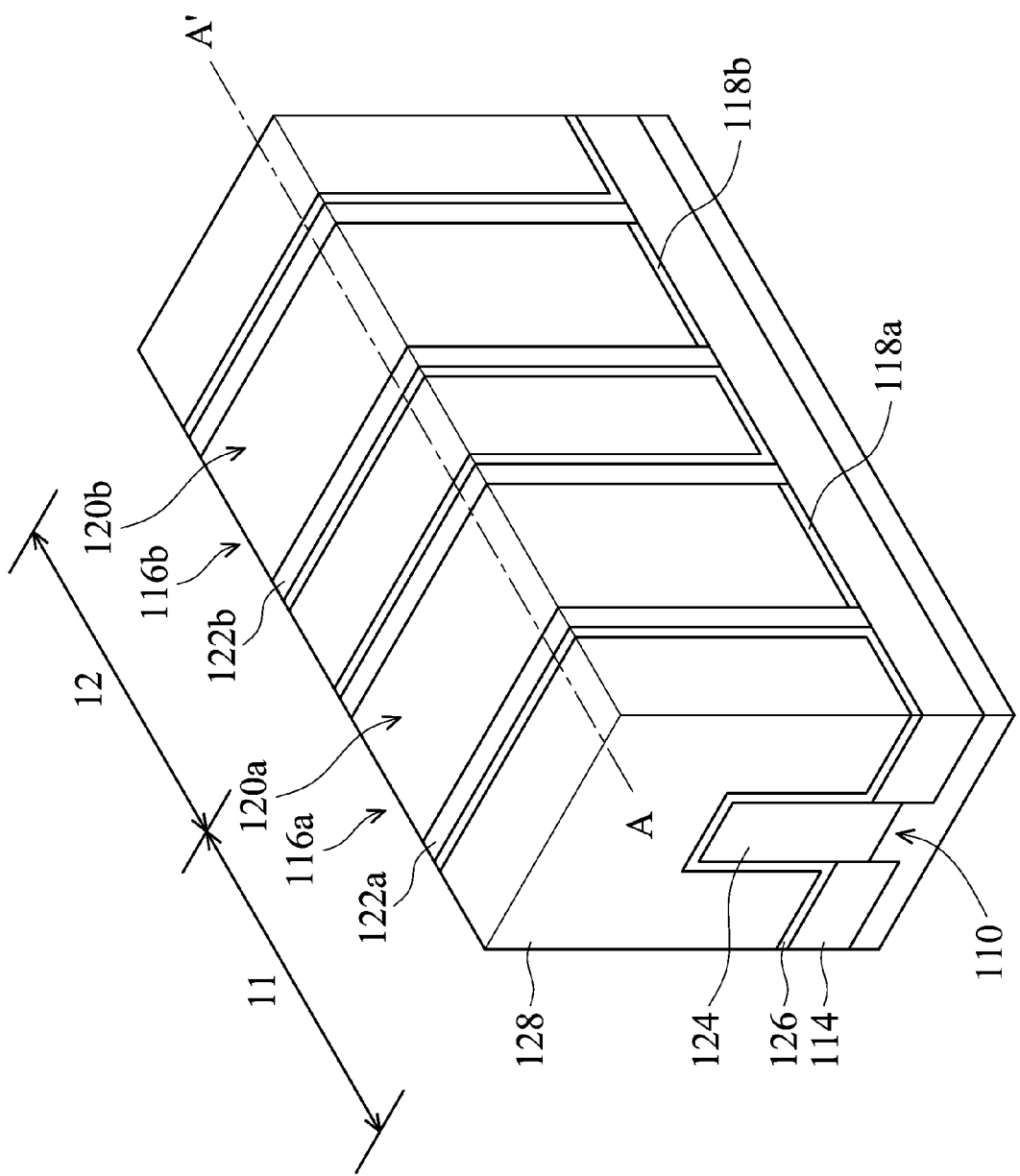

After the source/drain structures 124 are formed, a contact etch stop layer (CESL) 126 is formed over the substrate 102, and an inter-layer dielectric (ILD) structure 128 is formed over the contact etch stop layer 126 as shown in FIG. 1F, in accordance with some embodiments. In some embodiments, the contact etch stop layer 126 is made of silicon nitride, silicon oxynitride, and/or other applicable materials. The contact etch stop layer 126 may be formed by plasma enhanced CVD, low pressure CVD, ALD, or other applicable processes.

The ILD structure 128 may include multilayers made of multiple dielectric materials, such as silicon oxide, silicon nitride, silicon oxynitride, tetraethoxysilane (TEOS), phosphosilicate glass (PSG), borophosphosilicate glass (BPSG), low-k dielectric material, and/or other applicable dielectric materials. Examples of low-k dielectric materials include, but are not limited to, fluorinated silica glass (FSG), carbon doped silicon oxide, amorphous fluorinated carbon, parylene, bis-benzocyclobutenes (BCB), or polyimide. The ILD structure 128 may be formed by chemical vapor deposition (CVD), physical vapor deposition, (PVD), atomic layer deposition (ALD), spin-on coating, or other applicable processes.

Afterwards, a polishing process is performed to the ILD structure 128 until the top surface of the first dummy gate structure 116a and the top surface of the second dummy gate structure 116b are exposed. In some embodiments, the ILD structure 128 is planarized by a chemical mechanical polishing (CMP) process.

Figure 1G:
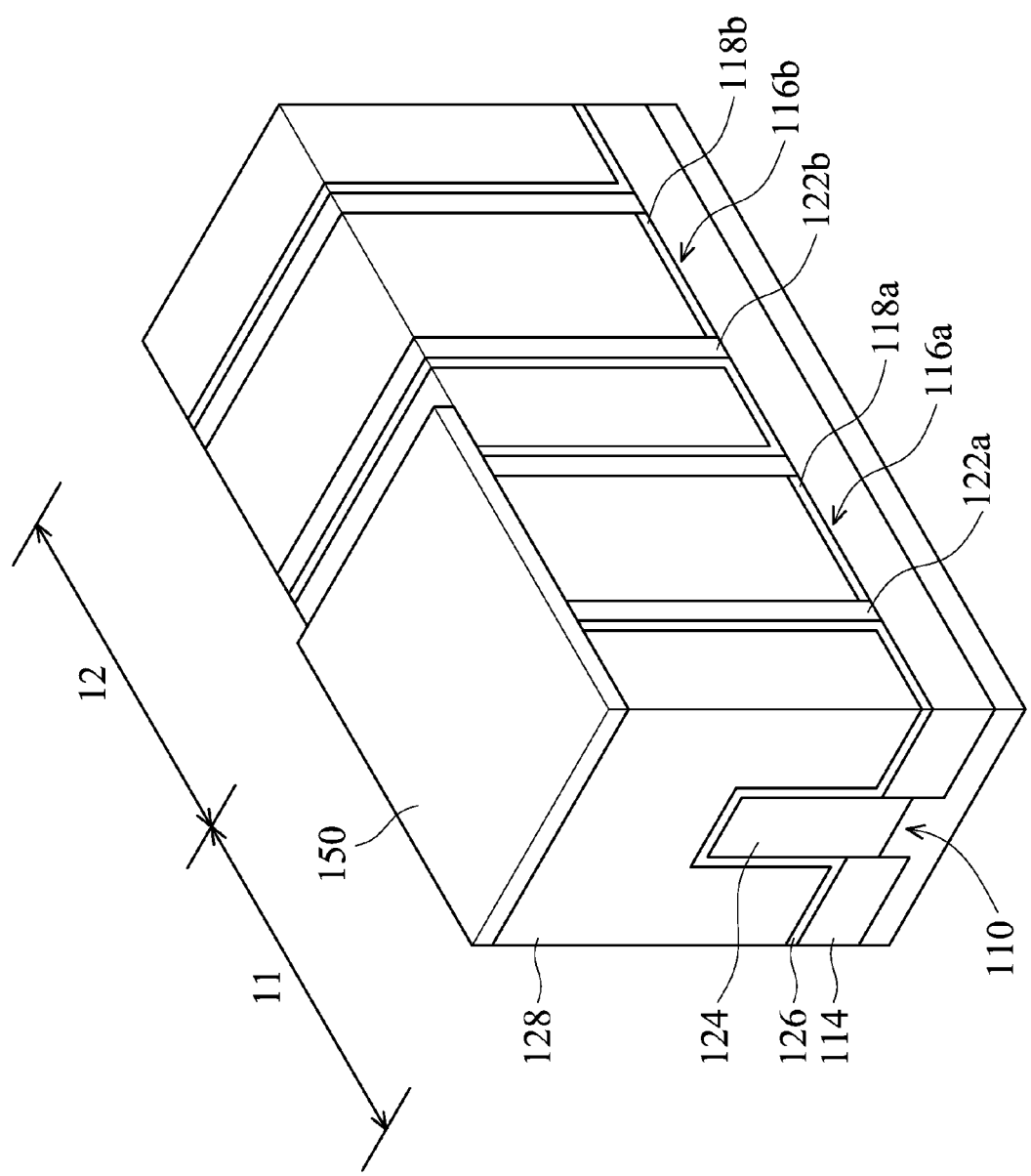

Afterwards, a photoresist layer 150 is formed over the first dummy gate structure 116a and a portion of the ILD structure 128 in the first region 11, as shown in FIG. 1G, in accordance with some embodiments. The photoresist layer 150 is used to protect the underlying layers being doped by the subsequent process.

Figure 1H:
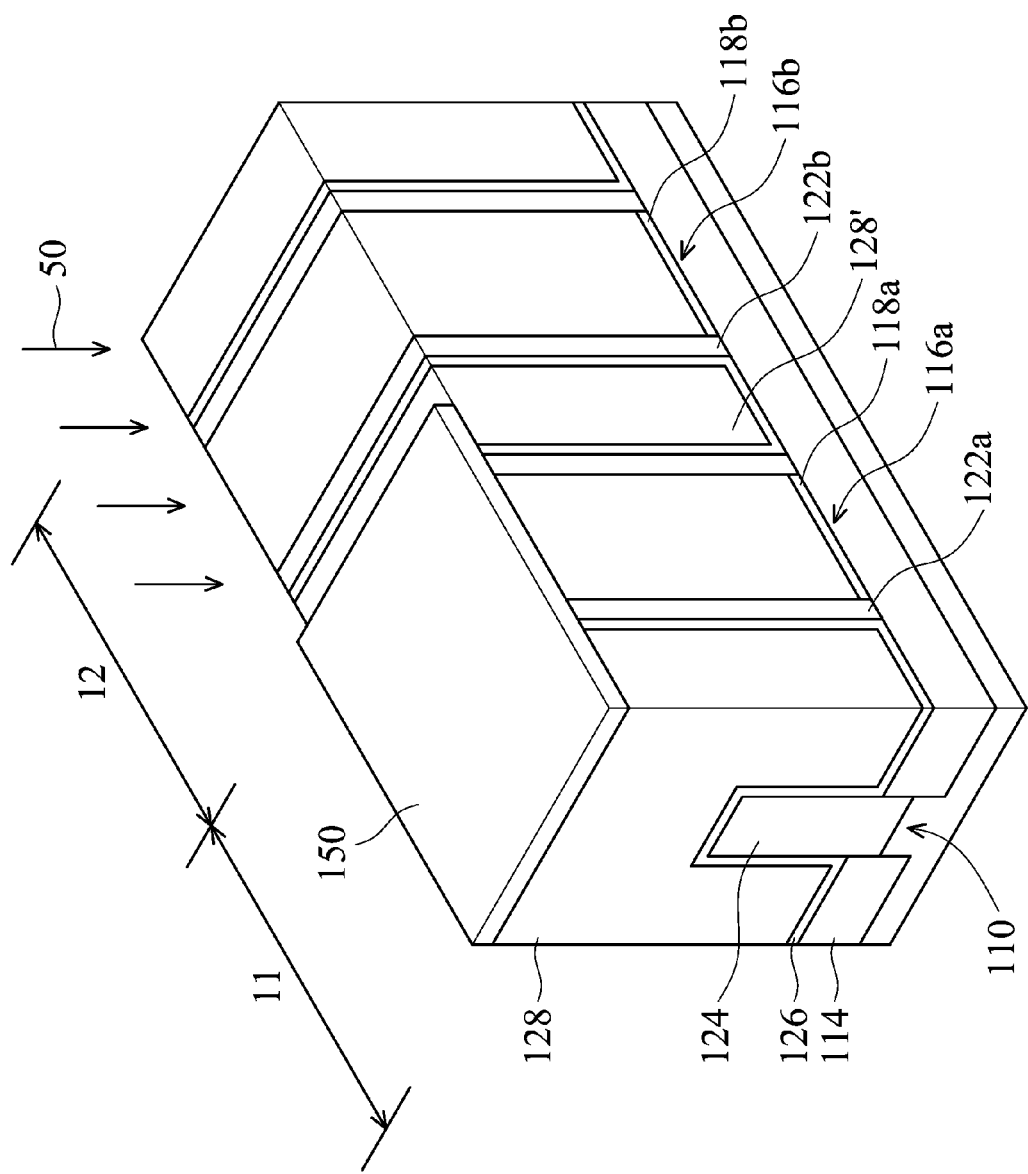

After the photoresist layer 150 is formed, an ion implantation process 50 is performed on the exposed second dummy gate structure 116b and the exposed portion of the ILD structure 128 in the second region 12, as shown in FIG. 1H, in accordance with some embodiments. The ion implantation process 50 is used to dope the exposed portion of ILD structure 128 to form a doped ILD structure 128'. As a result, the tensile stress of the doped ILD structure 128' is smaller than that of the ILD structure 128. In other words, the doped ILD structure 128' provides more compressive stress to the adjacent first dummy gate structure 116a and the second dummy gate structure 116b after the ion implantation process 50.

In some embodiments, the ion implantation process 50 is performed by using a dopant which has an atomic weight that is greater than the atomic weight of silicon (Si). In some embodiments, the dopant includes germanium (Ge), phosphor (P) or arsenic (As) or a combination thereof. In some embodiments, the concentration of the dopant is in a range from about $1*10^{14}$ ions/cm$^2$ to about $1*10^{16}$ ions/cm$^2$. If the concentration is smaller than $1*10^{14}$ ions/cm$^2$, the stress of the doped ILD structure 128' may not be changed. If the concentration is greater than $1*10^{16}$ ions/cm$^2$, the top width of the second trench 130b (shown in FIG. 2E) may be smaller than the bottom width of the second trench 130b.

After the ion implantation process 50 is performed, the concentration of the top portion of the doped ILD structure 128' is higher than the bottom portion of doped ILD structure 128'. More specifically, the doped ILD structure 128' has a gradient concentration. In addition, the doped ILD structure 128' between the first dummy gate structure 116a and the second dummy gate structure 116b has a tapered width from a bottom portion to a top portion.

Figure 1I:
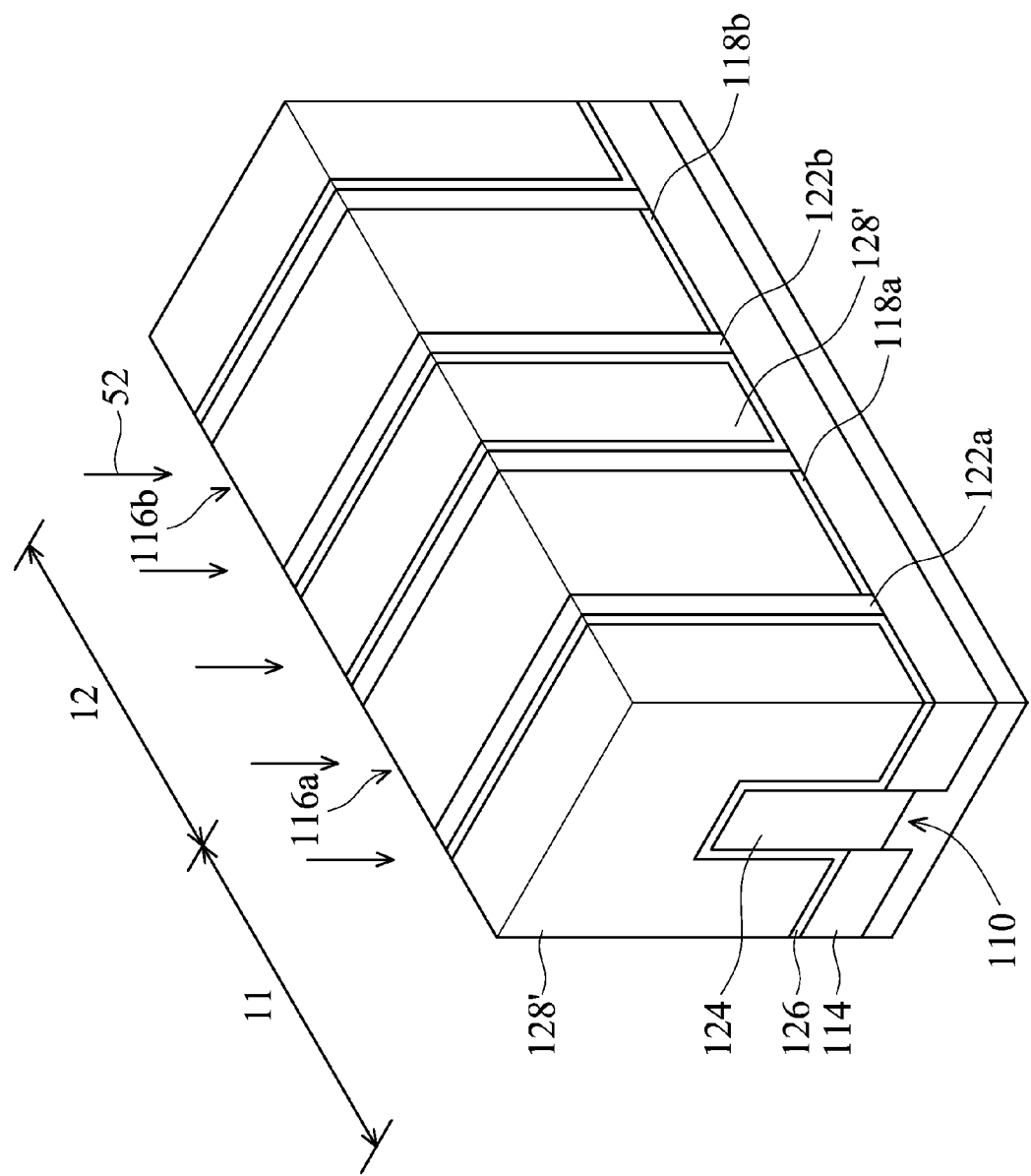

Afterwards, the photoresist layer 150 is removed, and an annealing process 52 is performed on the top surface of the doped ILD structure 128', the first dummy gate structure 116a and the second dummy gate structure 116b as shown in FIG. 1I, in accordance with some embodiments.

The annealing process 52 is used to activate the ion-implanted dopants (e.g. germanium (Ge)) after the ion implantation process 50. In addition, the annealing process 52 is used to repair the damage that is caused by the ion implantation process 50.

Figure 1J:
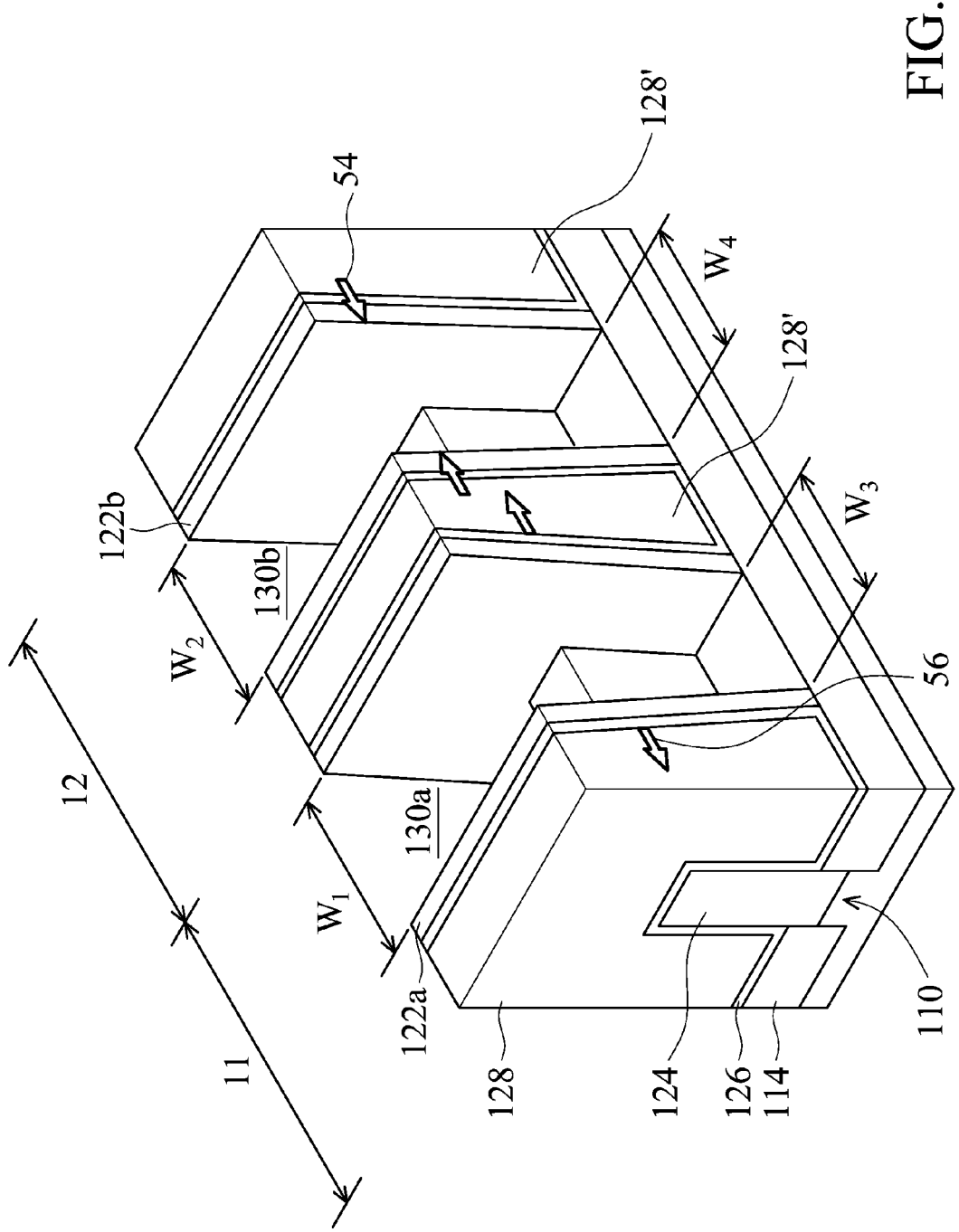

After the annealing process 52 is performed, the first dummy gate structure 116a is removed to form a first trench 130a in the first region 11 and the second dummy gate structure 116b is removed to form a second trench 130b in the second region 12 as shown in FIG. 1J, in accordance with some embodiments. In some embodiments, the first dummy gate structure 116a and the second dummy gate structure 116b may be removed by a wet etching process or a dry etching process.

In the second region 12, the doped ILD structure 128' provides more compressive stress 54 to the second trench 130b. In the first region 11, the undoped ILD structure 128 provides more tensile stress 56 and less compressive stress 54. It should be noted that after the first dummy gate structure 116a and the second dummy gate structure 116b are removed to form the first trench 130a and the second trench 130b, the stress of the ILD structure 128 is changed by the ion implantation process 50. As a result, the doped ILD structure 128' has a trapezoid-shaped structure.

The first trench 130a has a first top width $W_1$ in a direction that is parallel to the fin structure 110, and the second trench 130a has a second top width $W_2$ in a direction that is parallel to the fin structure 110. The first top width $W_1$ of the first trench 130a is greater than the second top width $W_2$ of the second trench 130b (as shown in FIGS. 1J and 2E).

Figure 1K:
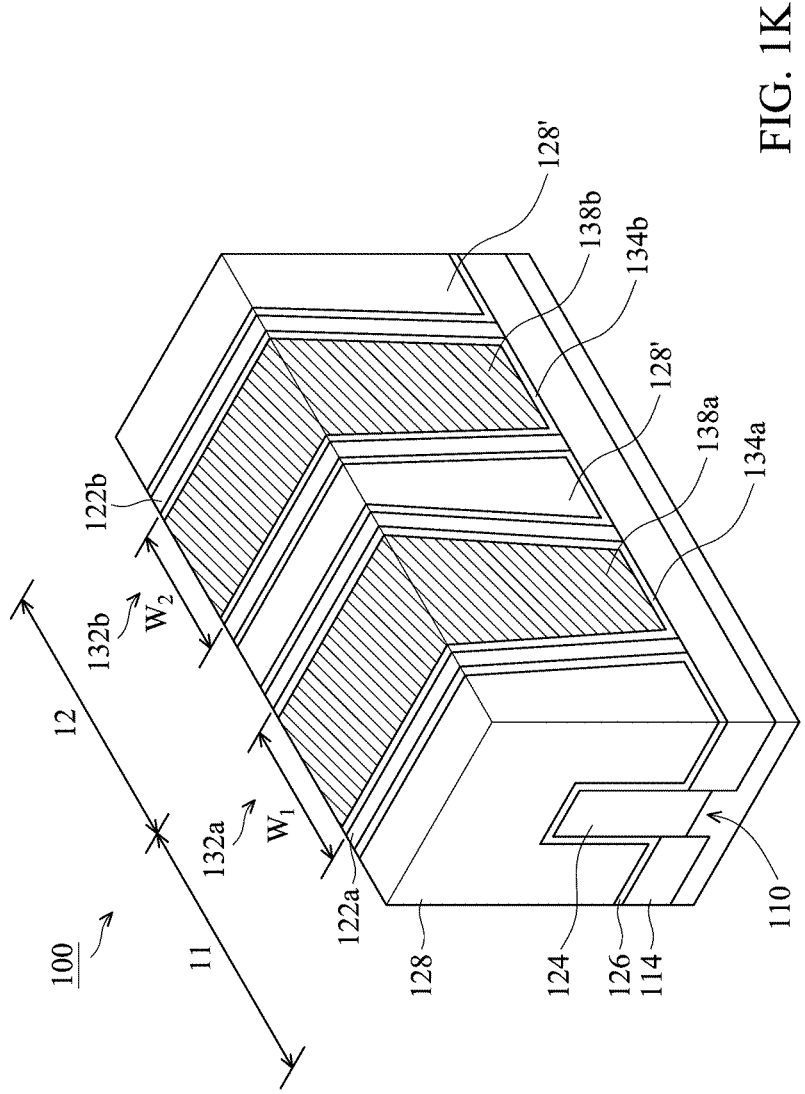

After the first trench 130a and the second trench 130b are formed, a first gate structure 132a and a second gate structure 132b are formed in the first trench 130a and the second trench 130b, respectively, as shown in FIG. 1K, in accordance with some embodiments.

The first gate structure 132a includes a first gate dielectric layer 134a and a first gate electrode layer 138a. The second gate structure 132b includes a second gate dielectric layer 134b and a second gate electrode layer 138b. In some other embodiments, the first gate structure 132a further includes a first work function layer between the first gate dielectric layer 134a and the first gate electrode layer 138a. The second gate structure 132b further includes a second work function layer between the second gate dielectric layer 134b and the second gate electrode layer 138b.

The first gate structure 132a has a trapezoid-shaped structure, and the second gate structure 132b also has a trapezoid-shaped structure. However, the shape of the first gate structure 132a is different from that of the second gate structure 132b.

The first gate dielectric layer 134a and a second gate dielectric layer 134b may be a single layer or multiple layers. The first gate dielectric layer 134a and the second gate dielectric layer 134b are made of silicon oxide (SiOx), silicon nitride (SixNy), silicon oxynitride (SiON), dielectric material(s) with high dielectric constant (high-k), or a combination thereof. In some embodiments, the first gate dielectric layer 134a and the second gate dielectric layer 134b are deposited by a plasma enhanced chemical vapor deposition (PECVD) process or by a spin coating process.

The first gate electrode layer 138a and the second gate electrode layer 138b are made of conductive material, such as aluminum (Al), copper (Cu), tungsten (W), titanium (Ti), tantalum (Ta), or other applicable materials. The first gate electrode layer 138a and the second gate electrode layer 138b are formed by a deposition process, such as chemical vapor deposition (CVD), physical vapor deposition (PVD), atomic layer deposition (ALD), high density plasma CVD (HDPCVD), metal organic CVD (MOCVD), or plasma enhanced CVD (PECVD).

The work function layer (not shown) is made of metal material, and the metal material may include N-work-function metal or P-work-function metal. The N-work-function metal includes tungsten (W), copper (Cu), titanium (Ti), silver (Ag), aluminum (Al), titanium aluminum alloy (TiAl), titanium aluminum nitride (TiAlN), tantalum carbide (TaC), tantalum carbon nitride (TaCN), tantalum silicon nitride (TaSiN), manganese (Mn), zirconium (Zr) or a combination thereof. The P-work-function metal includes titanium nitride (TiN), tungsten nitride (WN), tantalum nitride (TaN), ruthenium (Ru) or a combination thereof.

Figure 2A:
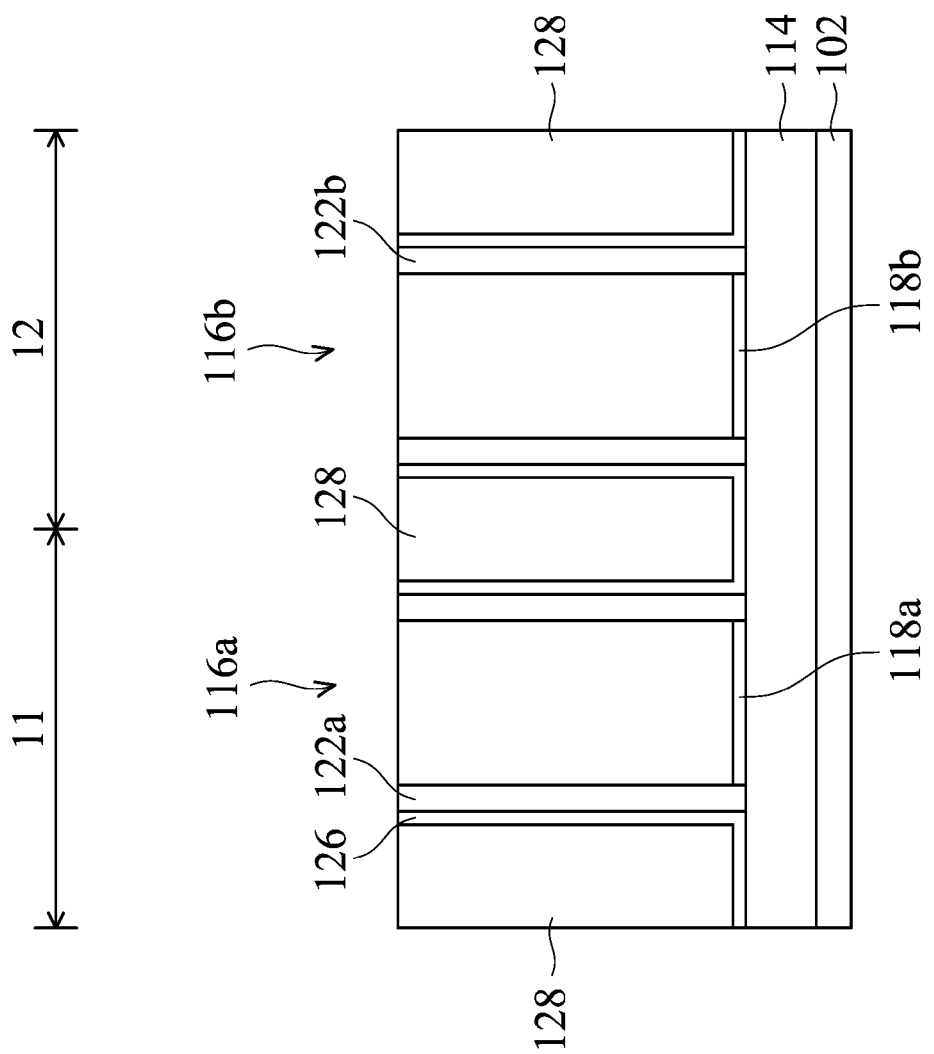
FIGS. 2A-2F show cross-sectional representations of various stages of forming a FinFET device structure shown in FIG. 1F-1K, in accordance with some embodiments of the disclosure.
Figure 2B:
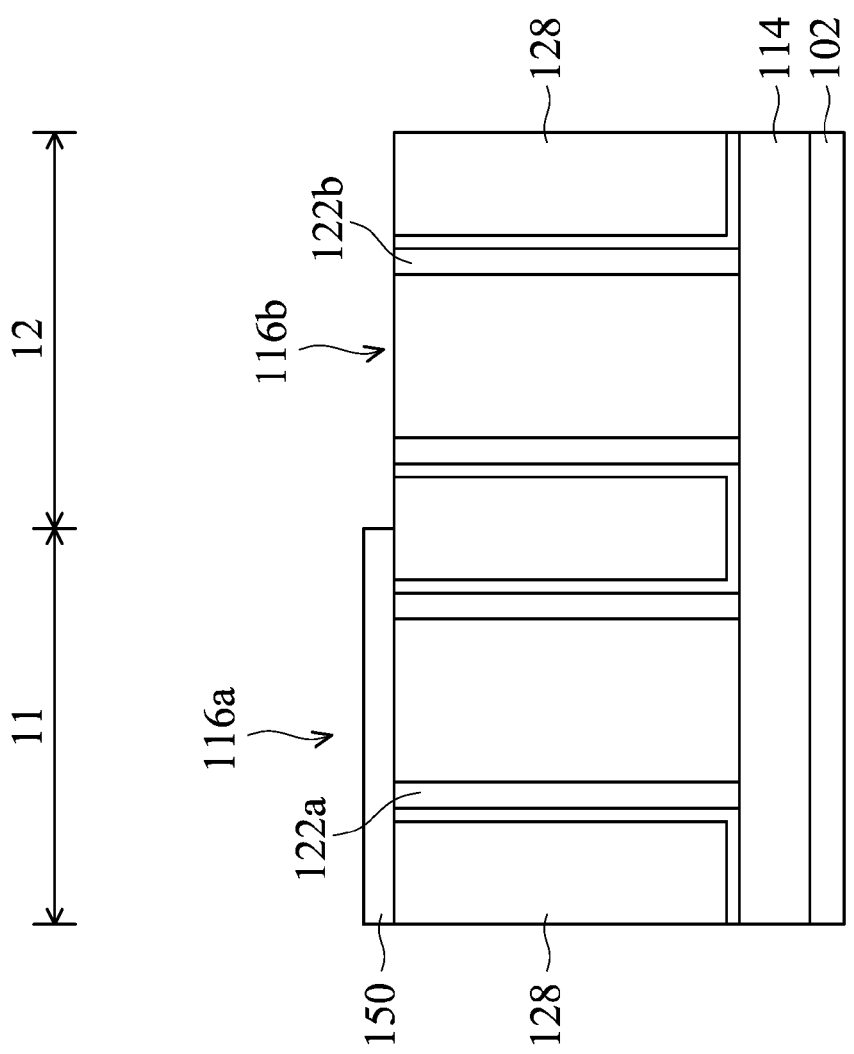
Figure 2C:
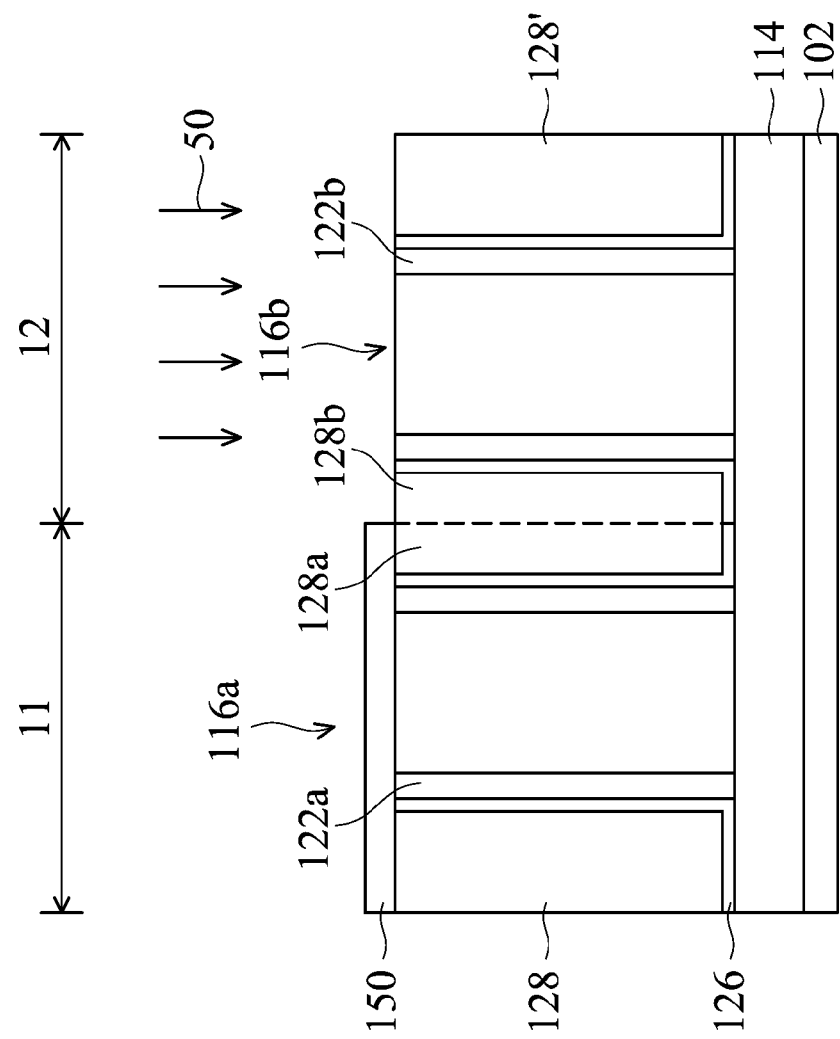
Figure 2D:
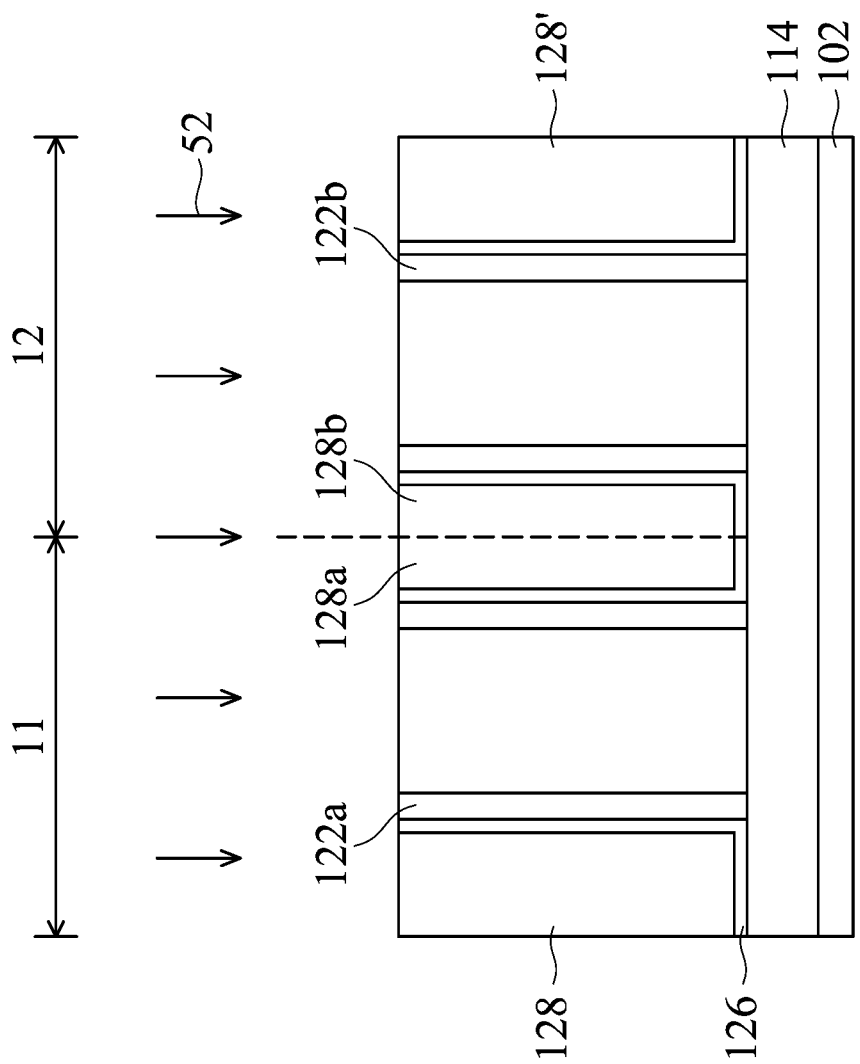
Figure 2E:
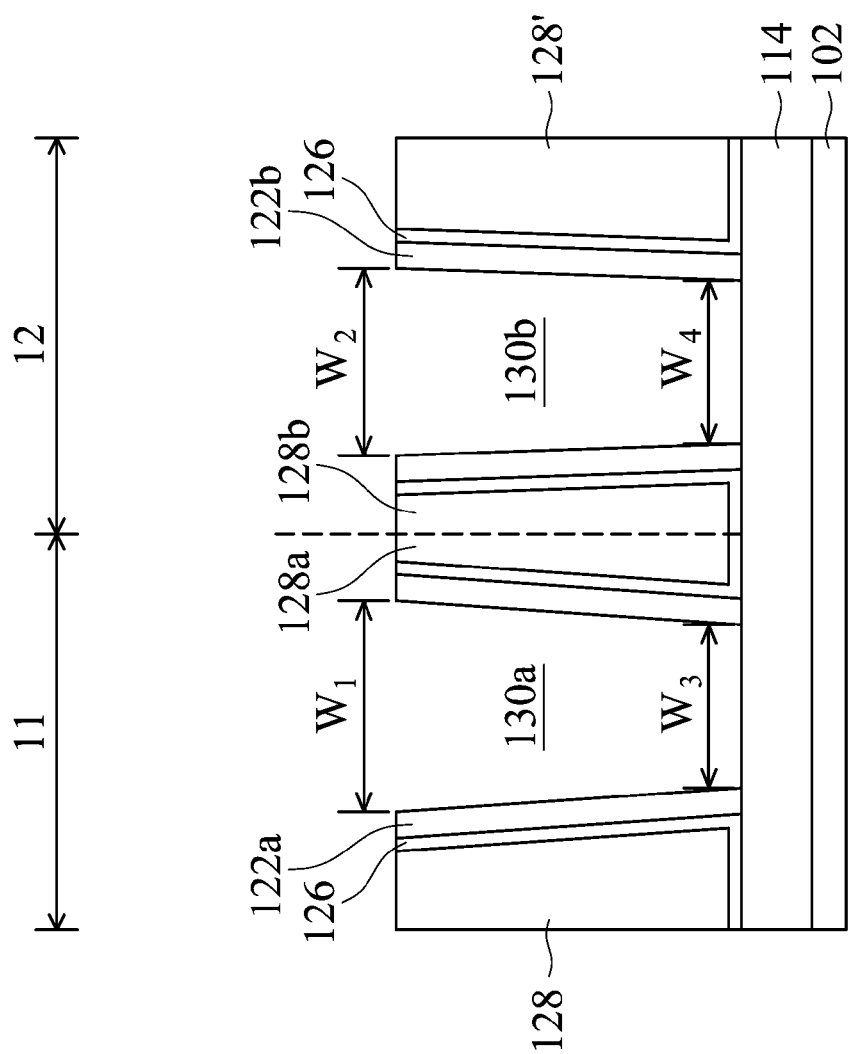

FIGS. 2A-2F show cross-sectional representations of various stages of forming a FinFET device structure 100 shown in FIG. 1F-1K, in accordance with some embodiments of the disclosure. FIG. 2A is a cross-sectional representation taken along the AA' line of FIG. 1F.

As shown in FIG. 2A, a polishing process is performed to the ILD structure 128 until the top surface of the first dummy gate structure 116a and the top surface of the second dummy gate structure 116b are exposed. Therefore, the top surface of the ILD structure 128, the top surface of the first dummy gate structure 116a and the top surface of the second dummy gate structure 116b are coplanar.

Afterwards, the photoresist layer 150 is formed over the first dummy gate structure 116a and a portion of the ILD structure 128 in the first region 11, as shown in FIG. 2B, in accordance with some embodiments. The photoresist layer 150 is configured to protect the underlying layers from being doped by the subsequent process.

After the photoresist layer 150 is formed, the ion implantation process 50 is performed on the exposed second dummy gate structure 116b and the exposed portion of the ILD structure 128 in the second region 12, as shown in FIG. 2C, in accordance with some embodiments. The ion implantation process 50 is performed on the ILD structure 128 to form the doped ILD structure 128'. The stress properties of the ILD structure 128 are changed or alerted by the ion implantation process 50. More specifically, the doped ILD structure 128' has more compressive stress than the undoped ILD structure 128. Therefore, the top width of the first trench 130a and the top width of the second trench 130b will be different.

The ILD structure 128 between the first dummy gate structure 116a and the second dummy gate structure 116b has two portions including a first undoped portion 128a and a second doped portion 128b. The dashed lines shown in FIGS. 2C-2F are used to define the profile of the two portions, but there is no real interface between the first undoped portion 128a and the second doped portion 128b. In some embodiments, the second doped portion 128b has Ge-gradient concentration. The Ge concentration of the top portion of the second doped portion 128b is higher than that of the bottom portion of the second doped portion 128b.

Afterwards, the photoresist layer 150 is removed, and the annealing process 52 is performed on the top surface of the doped ILD structure 128', the first dummy gate structure 116a and the second dummy gate structure 116b as shown in FIG. 2D, in accordance with some embodiments.

After the annealing process 52 is performed, the first dummy gate structure 116a is removed to form a first trench 130a in the first region 11 and the second dummy gate structure 116b is removed to form a second trench 130b in the second region 12 as shown in FIG. 2E, in accordance with some embodiments.

If no ion implantation process is performed on the ILD structure 128 in the second region 12, the ILD structure 128 will maintain its original property of having more tensile stress on the adjacent layers. Therefore, the second trench 130b will have a wide top width. When the ion implantation process is performed on the ILD structure 128 in the second region 12, the doped ILD structure 128' is obtained to have less tensile stress on the adjacent layers. More specifically, the doped ILD structure 128' provides more compressive stress. Therefore, the second trench 130b has a narrower top width than the first trench 130a has.

It should be noted that the ion implantation process 50 is not performed on the ILD structure 128 in the first region 11, and therefore the first trench 130a has a wider top width than the second trench 130b has. In some embodiments, the first trench 130a has a first top width $W_1$, and the second trench 130b has a second top width $W_2$. The first top width $W_1$ is greater than the second top width $W_2$. In some embodiments, the width of first top width $W_1$ to the second top width $W_2$ is in a range from about 1.2 to about 2.5. When the ratio is within the above-mentioned range, the transistors in both of the first region 11 and the second region 12 have good performance.

The first trench 130a has a third bottom width $W_3$, and the second trench 130b has a fourth bottom width $W_4$. In some embodiments, the third bottom width $W_3$ is equal to the fourth bottom width $W_4$. In some embodiments, the first top width $W_1$ is greater than the third bottom width $W_3$, and the second top width $W_2$ is greater than the fourth bottom width $W_4$. Therefore, the first trench 130a has a trapezoid-shaped structure, and the second trench 130b also has a trapezoid-shaped structure.

Figure 2F:
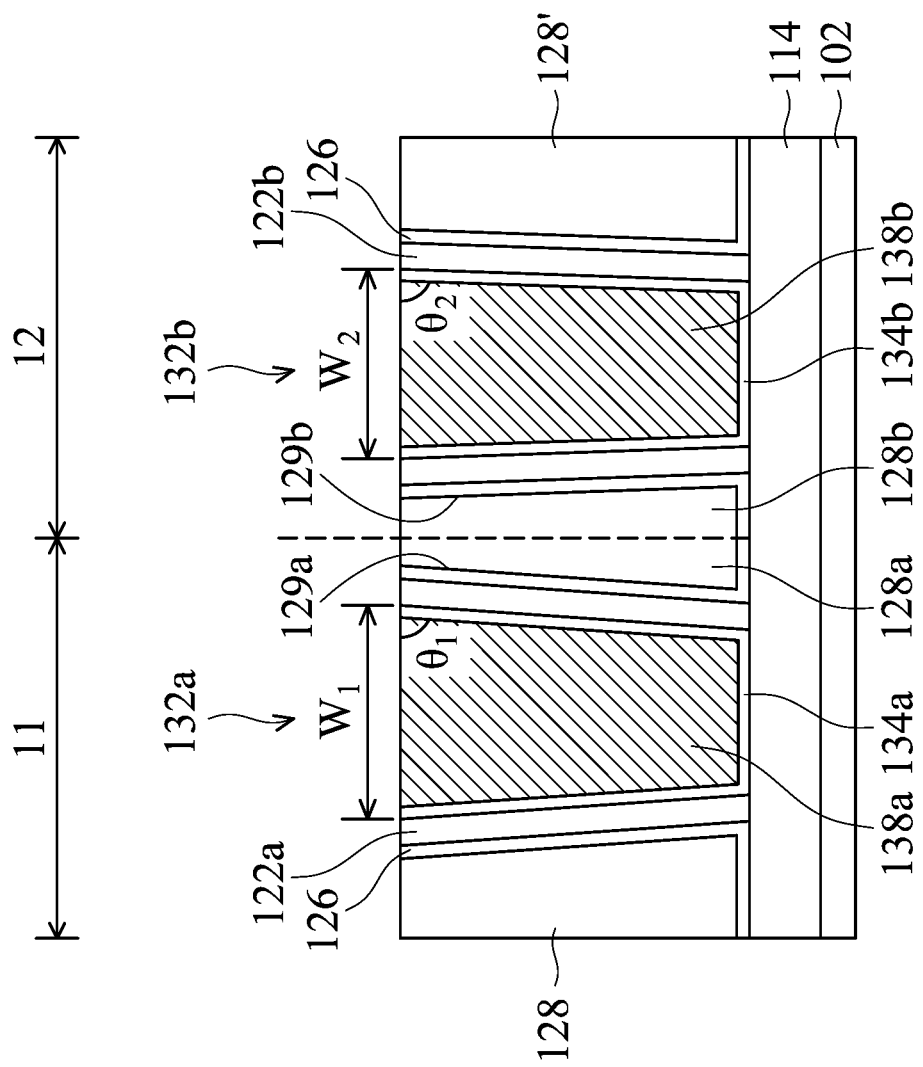

After the first trench 130a and the second trench 130b are formed, the first gate structure 132a and the second gate structure 132b are formed in the first trench 130a and the second trench 130b, respectively, as shown in FIG. 2F, in accordance with some embodiments.

It should be noted that the top width of the gate structure may affect the performance of the transistor depending on what type of the transistor. For example, if a P-type gate structure or a PMOS transistor is formed in the narrow second trench 130b in the second region 12, the performance of the P-type gate structure or a PMOS transistor will be improved. If a N-type gate structure or a NMOS transistor is formed in the narrowed second trench 130b in the second region 12, the performance of the N-type gate structure or a NMOS transistor will be decreased.

In order to improve the performance of the transistors in both of the first region 11 and the second region 12, different type transistors are formed in the first trench 130a and the second trench 130b. In some embodiments, the first gate structure 132a in the first region 11 is a N-type gate structure, and the second gate structure 132b in the second region 12 is a P-type gate structure. When the N-type gate structure or the NMOS transistor is formed in the first trench 130a with the wide top width $W_1$ in the first region 11, the saturation current (Isa) of the NMOS transistor is increased and the performance of N-type gate structure or the NMOS transistor is improved. When the P-type gate structure or the NMOS transistor is formed in the second width 130b with the narrow top width $W_2$ in the second region, the saturation current (Isa) of the PMOS transistor is increased and the performance of P-type gate structure or the PMOS transistor is improved.

As shown in FIG. 2F, the first gate structure 132a has a trapezoid-shaped structure, and the second gate structure 132b has a trapezoid-shaped structure. The first gate structure 132a has the first top width $W_1$, and the second gate structure 132b has the second top width $W_2$. The first top width $W_1$ includes the thickness of the first gate dielectric layer 134a and the thickness of the first gate electrode layer 138a. The second top width $W_2$ includes the thickness of the second gate dielectric layer 134b and the thickness of the second gate electrode layer 138b.

As shown in FIG. 2F, a first angle $\theta_1$ is between a top surface of the first gate structure and a sidewall surface of the first gate structure 132a. A second angle $\theta_2$ is between a top surface of the second gate structure 132b and a sidewall surface of the second gate structure 132b. The first angle $\theta_1$ and the second angle $\theta_2$ are acute angles. In some embodiments, the difference between the first angle $\theta_1$ and the second angle $\theta_2$ is in a range from about 5 degrees to 25 degrees. When the difference is within the above-mentioned range, the transistors in both of the first region 11 and the second region 12 have good performance.

The doped ILD structure 128' between the first gate structure 132a and the second gate structure 132b has a trapezoid-shaped structure. The first sidewall 129a of the first undoped portion 128a is not parallel to the second sidewall 129b of the second doped portion 128b. When the dashed line is used as a middle line, the shape of the first undoped portion 128a is not symmetric to the shape of the second doped portion 128b.

The contact etch stop layer 126 has sloped sidewalls, and the first sidewalls 122a and the second sidewalls 122b both have sloped sidewalls.

Embodiments for forming a FinFET device structure and method for formation the same are provided. The FinFET device structure includes two different types of transistors with different gate profiles. An ILD structure is formed between a first dummy gate structure and a second dummy gate structure. A portion of the ILD structure is doped to form a doped ILD structure. The stress of the doped ILD structure is changed. After the first dummy gate structure and the second dummy gate structure are removed to form a first trench and a second trench. The top width of the second trench is smaller than the top width of the first trench because the stress of the doped ILD structure is changed. As a result, a N-type gate structure is formed in the first trench with wide top width, and a P-type gate structure is formed in the second trench with a narrow top width to increase the saturation current (Isa) of the transistors. As a result, the performance of the FinFET device structure is improved.

In some embodiments, a FinFET device structure is provided. The FinFET device structure includes a fin structure formed over a substrate and an isolation structure formed over the substrate. The FinFET device structure includes a first gate structure and a second gate structure formed over the fin structure. The first gate structure has a first top width in a direction that is parallel to the fin structure, the second gate structure has a second top width in a direction that is parallel to the fin structure, and the first top width is greater than the second top width.

In some embodiments, a FinFET device structure is provided. The FinFET device structure includes a fin structure formed over a substrate and an isolation structure formed over the substrate. The FinFET device structure includes a first gate structure and a second gate structure formed over the fin structure, and the first gate structure has a trapezoid-shaped structure and the second gate structure has a trapezoid-shaped structure. The FinFET device structure also includes a first angle is between a top surface of the first gate structure and a sidewall surface of the first gate structure, a second angle is between a top surface of the first gate structure and a sidewall surface of the second gate structure, and the second angle is greater than the first angle.

In some embodiments, a method for forming a FinFET device structure is provided. The method includes forming a fin structure over a substrate, and the substrate includes a first region and a second region. The method includes forming a first dummy gate structure and a second dummy gate structure over the fin structure. The method includes forming an inter-layer dielectric (ILD) structure over the substrate and adjacent to the first dummy gate structure and the second dummy gate structure. The method includes performing an ion implant process on a portion of the ILD structure and the second dummy gate structure in the second region and removing the first dummy gate structure and the second dummy gate structure to form a first trench and a second trench in the ILD structure. The method also includes forming a first gate structure in the first trench and a second gate structure in the second trench. The first gate structure has a trapezoid-shaped structures and the second gate structure has a trapezoid-shaped structures. The first gate structure has a first top width in a direction that is parallel to the fin structure, the second gate structure has a second top width in a direction that is parallel to the fin structure, and the first top width is larger than the second top width.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A fin field effect transistor (FinFET) device structure, comprising:
    a fin structure formed over a substrate;
    an isolation structure formed over the substrate; and
    a first gate structure and a second gate structure formed over the fin structure, wherein the first gate structure has a first top width in a direction that is parallel to the fin structure, the second gate structure has a second top width in a direction that is parallel to the fin structure, and the first top width is greater than the second top width, wherein a first angle is between a top surface of the first gate structure and a sidewall surface of the first gate structure, a second angle is between a top surface of the second gate structure and a sidewall surface of the second gate structure, and the second angle is greater than the first angle.

2. The fin field effect transistor (FinFET) device structure as claimed in claim 1, wherein a ratio of the first top width to the second top width is in a range from about 1.2 to about 2.5.

3. The fin field effect transistor (FinFET) device structure as claimed in claim 1, wherein the first gate structure is a first conductivity type, and the second gate structure is a second conductivity type opposite to the first conductivity type.

4. The fin field effect transistor (FinFET) device structure as claimed in claim 3, wherein the first conductivity type gate structure is an N-type gate structure, and the second conductivity type gate structure is a P-type gate structure.

5. The fin field effect transistor (FinFET) device structure as claimed in claim 1, wherein the first gate structure has a trapezoid-shaped structure with a first bottom width, and the first top with is greater than the first bottom width.

6. The fin field effect transistor (FinFET) device structure as claimed in claim 1, further comprising:
    an inter-layer dielectric (ILD) structure between the first gate structure and a second gate structure, wherein the ILD structure has a trapezoid-shaped structure.

7. The fin field effect transistor (FinFET) device structure as claimed in claim 6, wherein the ILD structure has a Ge-gradient concentration.

8. The fin field effect transistor (FinFET) device structure as claimed in claim 6, further comprising:
    a contact etch stop layer (CESL) formed between ILD structure and the first gate structure, wherein the contact etch stop layer has sloped sidewalls.

9. The fin field effect transistor (FinFET) device structure as claimed in claim 6, wherein the ILD structure comprises an undoped portion and a doped portion, and a first sidewall of the undoped portion is not parallel to a sidewall of the doped portion.

10. A fin field effect transistor (FinFET) device structure, comprising:
    a fin structure formed over a substrate;
    an isolation structure formed over the substrate; and
    a first gate structure and a second gate structure formed over the fin structure, wherein the first gate structure has a trapezoid-shaped structure, the second gate structure has a trapezoid-shaped structure, and a first angle is between a top surface of the first gate structure and a sidewall surface of the first gate structure, a second angle is between a top surface of the first gate structure and a sidewall surface of the second gate structure, and the second angle is greater than the first angle.

11. The fin field effect transistor (FinFET) device structure as claimed in claim 10, wherein the first gate structure is an N-type gate structure, and the second gate structure is a P-type gate structure.

12. The fin field effect transistor (FinFET) device structure as claimed in claim 10, further comprising:
    an inter-layer dielectric (ILD) structure between the first gate structure and the second gate structure, wherein the ILD structure has a trapezoid-shaped structure.

13. The fin field effect transistor (FinFET) device structure as claimed in claim 10, wherein the ILD structure has a tapered width from a bottom portion to a top portion.

14. The fin field effect transistor (FinFET) device structure as claimed in claim 10, wherein the ILD structure has a Ge-gradient concentration.

15. A fin field effect transistor (FinFET) device structure, comprising:
    a fin structure formed over a substrate;
    an isolation structure formed over the substrate;
    a first gate structure and a second gate structure formed over the fin structure; and
    an inter-layer dielectric (ILD) structure between the first gate structure and the second gate structure, wherein the ILD structure has a trapezoid-shaped structure, and the ILD structure comprises an undoped portion and a doped portion, and a first sidewall of the undoped portion is not parallel to a second sidewall of the doped portion.

16. The fin field effect transistor (FinFET) device structure as claimed in claim 15, further comprising:
   a contact etch stop layer (CESL) formed between ILD structure and the first gate structure, wherein the contact etch stop layer has sloped sidewall surfaces.

17. The fin field effect transistor (FinFET) device structure as claimed in claim 15, wherein the ILD structure has a pair of sidewall surfaces, and the sidewall surfaces of the ILD structure taper gradually toward a top surface of the ILD structure.

18. The fin field effect transistor (FinFET) device structure as claimed in claim 15, wherein the first gate structure has a pair of sidewall surfaces, and the sidewall surfaces of the first gate structure taper gradually toward a bottom surface of the first gate structure.

* * * * *